(12) United States Patent
Kim et al.

(10) Patent No.: US 8,994,333 B2
(45) Date of Patent: Mar. 31, 2015

(54) BATTERY PACK AND METHOD OF CONTROLLING THE SAME

(75) Inventors: Jin-Wan Kim, Yongin-si (KR); Susumu Segawa, Yongin-si (KR); Eui-Jeong Hwang, Yongin-si (KR); Se-Sub Sim, Yongin-si (KR); Jong-Woon Yang, Yongin-si (KR); Han-Seok Yun, Yongin-si (KR); Beom-Gyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 251 days.

(21) Appl. No.: 13/224,202

(22) Filed: Sep. 1, 2011

(65) Prior Publication Data

US 2012/0056598 A1    Mar. 8, 2012

(30) Foreign Application Priority Data

Sep. 2, 2010   (KR) .................. 10-2010-0086169

(51) Int. Cl.
    *H02J 7/00*    (2006.01)
(52) U.S. Cl.
    CPC .................................. *H02J 7/0031* (2013.01)
    USPC ......................... 320/134; 320/135; 320/136

(58) Field of Classification Search
    USPC .................................................. 320/134–136
    See application file for complete search history.

(56) References Cited

U.S. PATENT DOCUMENTS

| | | | | |
|---|---|---|---|---|
| 5,610,495 | A * | 3/1997 | Yee et al. ...................... | 320/116 |
| 6,417,648 | B2 * | 7/2002 | Suzuki et al. ................. | 320/136 |
| 6,531,846 | B1 * | 3/2003 | Smith ............................ | 320/134 |
| 2007/0194751 | A1 | 8/2007 | Odaohhara | |
| 2010/0123434 | A1 * | 5/2010 | Iwata ............................ | 320/118 |
| 2010/0127662 | A1 | 5/2010 | Ha et al. | |
| 2010/0225277 | A1 * | 9/2010 | Ochi et al. .................... | 320/132 |

FOREIGN PATENT DOCUMENTS

| | | |
|---|---|---|
| JP | 2007-194052 A | 8/2007 |
| KR | 10-2008-0023377 A | 3/2008 |

* cited by examiner

*Primary Examiner* — Samuel Berhanu
(74) *Attorney, Agent, or Firm* — Christie, Parker & Hale, LLP

(57) ABSTRACT

A battery pack including a plurality of battery cells and a method of controlling the battery pack are provided. The method includes: permanently cutting off charging and discharging paths of the battery pack; and discharging one or more of the battery cells when a condition of which satisfies a reference condition. Therefore, state of the battery pack changes from its failure state to a stable state.

13 Claims, 4 Drawing Sheets

BATTERY PACK AND METHOD OF CONTROLLING THE SAME

CROSS-REFERENCE TO RELATED APPLICATION

This application claims priority to and the benefit of Korean Patent Application No. 10-2010-0086169, filed on Sep. 2, 2010, in the Korean Intellectual Property Office, the content of which is incorporated herein in its entirety by reference.

BACKGROUND

1. Field

One or more embodiments of the present invention relate to a battery pack and a method of controlling the battery pack.

2. Description of the Related Art

With the widespread use of portable electronic devices, e.g., cellular phones, digital cameras, notebook computers, etc., batteries have been developed to power the portable electronic devices as power sources so as to operate the portable electronic devices.

A battery pack includes battery cells and protection circuits which control charging and discharging of the battery cells. The batteries are classified into lithium ion (Li-ion) batteries, nickel cadmium (Ni—Cd) batteries, and the like, according to the types of the battery cells, which are rechargeable secondary batteries.

SUMMARY

Aspects of one or more embodiments of the present invention are directed toward a battery pack capable of being restored from a failed state to a stable state, and a method of controlling the battery pack.

Additional aspects will be set forth in part in the description which follows and, in part, will be apparent from the description, or may be learned by practice of the presented embodiments.

According to one or more embodiments of the present invention, a method of controlling a battery pack including a plurality of battery cells is provided. The method includes: permanently cutting off charging and discharging paths of the battery pack; and discharging one or more of the battery cells when they satisfy a reference condition.

The method may further include measuring voltages of the plurality of battery cells.

A battery cell having the measured voltage greater than or equal to a reference voltage from among the plurality of battery cells may be discharged.

The method may further include measuring temperatures of the plurality of battery cells.

A battery cell having the measured temperature greater than or equal to a reference temperature from among the plurality of battery cells may be discharged.

According to one or more embodiments of the present invention, a battery pack includes: a plurality of battery cells; a protection device for permanently cutting off charging and discharging of the battery pack; a discharge circuit for discharging the plurality of battery cells; and a battery management system (BMS) for operating the discharge circuit to discharge one or more of the plurality of battery cells, when the one or more of the plurality of battery cells satisfy a reference condition, after operating the protection device.

The battery pack may further include a voltage measuring device for measuring voltages of the plurality of battery cells.

The BMS may be configured to discharge a battery cell having the measured voltage greater than or equal to a reference voltage from among the plurality of battery cells.

The battery pack may further include a temperature measuring device for measuring temperatures of the plurality of battery cells.

The BMS may be configured to discharge a battery cell having the measured temperature greater than or equal to a reference temperature from among the plurality of battery cells.

According to another embodiment of the present invention, a battery pack includes a plurality of battery cells, a sensing device for sensing conditions of the plurality of battery cells, and a protection device for permanently disabling charging and discharging of the battery pack in response to sensing an abnormal condition by the sensing device, and for discharging one or more of the plurality of battery cells.

BRIEF DESCRIPTION OF THE DRAWINGS

These and/or other aspects of the present invention will become apparent and more readily appreciated from the following description of the embodiments, taken in conjunction with the accompanying drawings of which.

DETAILED DESCRIPTION

Figure 1:
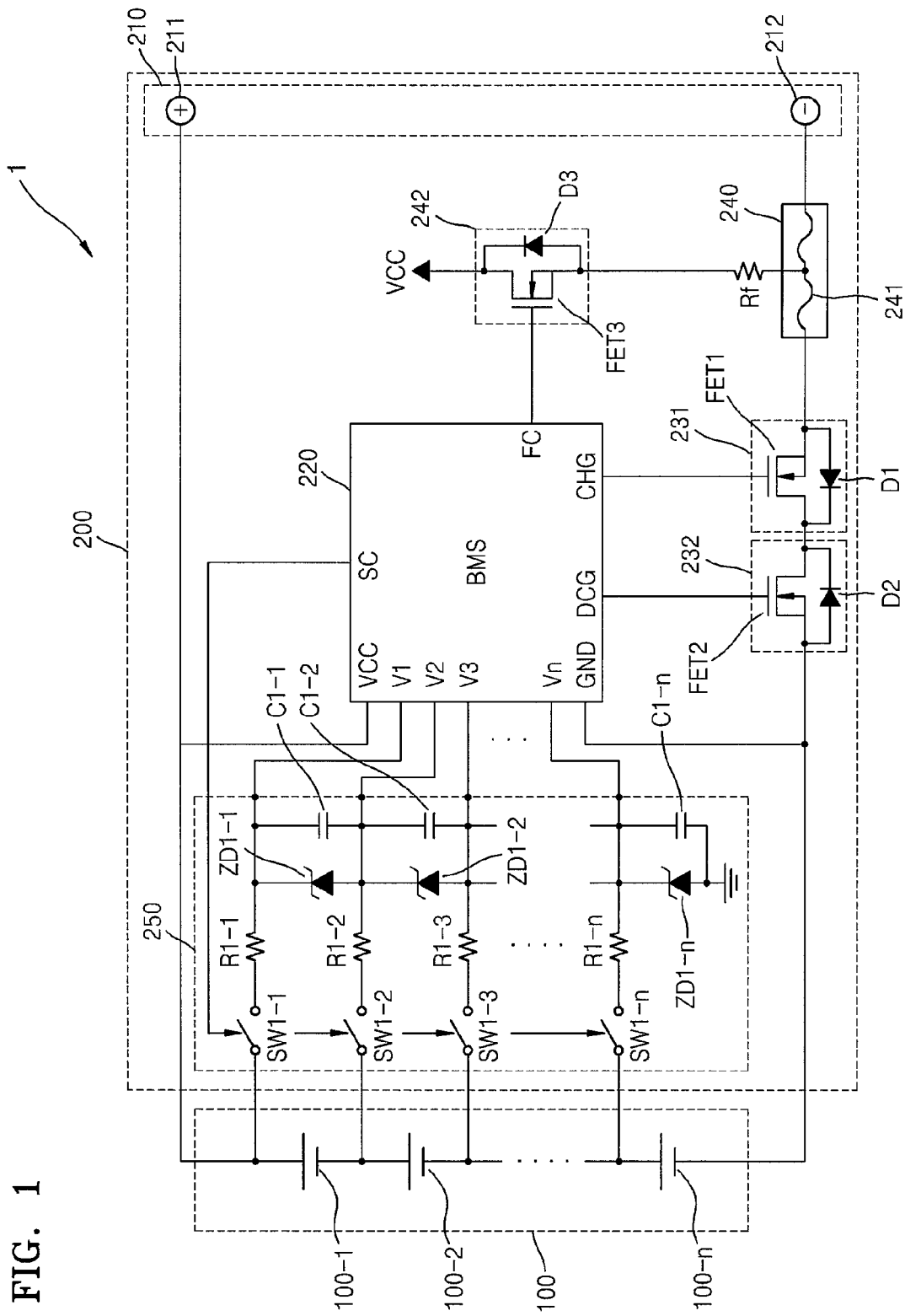
FIG. 1 is a circuit diagram illustrating a battery pack according to an embodiment of the present invention.

Hereinafter, examples of embodiments of the present invention will be described with reference to the accompanying drawings. In the following description and drawings, the same reference numerals are used to designate the same or similar components, and repetition of the description on the same or similar components will be omitted.

Parts necessary for understanding operations of the embodiments of the present invention will be primarily described below; however, other descriptions may be omitted so as not to blur the scope of the present invention. Also, the terminology or words used in the present specification and claims that will be described below shall not be construed as being limited to general or dictionary meaning. However, the terminology or words shall be interpreted to be consistent with the spirit and scope of the present invention so as to appropriately express embodiments of the present invention.

FIG. 1 is a circuit diagram illustrating a battery pack 1 according to an embodiment of the present invention.

Referring to FIG. 1, the battery pack 1 includes a battery 100 and a protection circuit 200.

The battery 100 may include one or more battery cells 100-1, 100-2, . . . , and 100-n. The battery 100 is coupled to the protection circuit 200 and is charged or discharged when a charger or an external device is coupled to a terminal part 210 of the protection circuit 200. Here, the external device refers to, for example, a load of a cellular phone, a notebook computer, or the like, which consumes electric energy stored in the battery 100. The battery 100 is a rechargeable secondary battery.

The protection circuit 200 controls charging and discharging of the battery 100 and controls components of the battery pack 1 to stably operate the battery pack 1. The protection circuit 200 includes the terminal part 210, a battery management system (BMS) 220, a charge control switch 231, a discharge control switch 232, a protection device 240, a protection device control switch 242, and a discharge circuit 250.

The terminal part 210 is coupled to a charger, which charges the battery 100, or an external device. The terminal part 210 includes at least a positive terminal 211 and a negative terminal 212 and may further include a terminal for communicating with the charger or the external device.

If the charger is coupled to the terminal part 210, a current flows into the battery 100 through the positive terminal 211 and flows out of the battery 100 through the negative terminal 212, thereby charging the battery 100. If the external device is coupled to the terminal part 210, a current flows into the battery 100 through the negative terminal 212 and flows out of the battery 100 through the positive terminal 211, thereby discharging the battery 100.

The BMS 220 controls, for example, cell balancing, charging, and discharging of the battery 100. The BMS 220 includes a power supply terminal VCC, a ground terminal GND, a charge control terminal CHG, a discharge control terminal DCG, a protection device control terminal FC, at least one switch control terminal SC, and at least one or more voltage sensing terminals V1, V2, V3, . . . , and Vn.

A power supply voltage and a ground voltage are respectively applied to the power supply terminal VCC and the ground voltage GND. If the battery pack 1 is abnormal, the charge control terminal CHG and the discharge control terminal DCG respectively output a charge control signal for controlling an operation of the charge control switch 231 and a discharge control signal for controlling an operation of the discharge control switch 232.

The protection device control terminal FC outputs a control signal for controlling on and off operations of the protection device control switch 242. When the charge control switch 231 and/or the discharge control switch 232 are switched off to stop charging and/or discharging operations, the protection device control terminal FC operates the protection device 240 to permanently disable (e.g., cut off) a function of the battery pack 1 if the state of the battery 100 satisfies a reference condition (e.g., a preset condition). The reference condition may indicate that a voltage or temperature of the battery 100 is greater than or equal to a reference value. Alternatively, the reference condition may indicate that the voltage or temperature of the battery 100 is maintained greater than or equal to the reference value for a set period of time. However, the reference condition is not limited thereto but may be changed to various conditions to stably control the battery pack 1.

The voltage sensing terminals V1, V2, V3, . . . , and Vn measure intermediate voltages of the battery 100. In other words, the voltage sensing terminals V1, V2, V3, . . . , and Vn are electrically coupled to nodes respectively to measure voltages of the battery cells 100-1, 100-2, . . . , and 100-n, wherein the nodes are positioned between the battery cells 100-1, 100-2, . . . , and 100-n. The BMS 220 may be an example of a voltage measuring device.

The switch control terminal SC outputs a switching control signal to control on and off operations of switches SW1-1, SW1-2, SW1-3, . . . , and SW1-n of the discharge circuit 250. One terminal and one signal line are shown in FIG. 1 for convenience, but a plurality of signal lines and a plurality of terminals as the switch control terminal SC may be installed to respectively control the switches SW1-1, SW1-2, SW1-3, . . . and SW1-n.

The BMS 220 senses a charged state or a discharged state of the battery 100, a current flow state in the battery pack 1, and the like through the terminals. The BMS 220 may also measure an intermediate voltage among the battery cells 100-1, 100-2, . . . , and 100-n. The BMS 220 controls cell balancing, charging, and discharging of the battery 100 according to the measurement result.

The BMS 220 may control the switches SW1-1, SW1-2, SW1-3, . . . , and SW1-n of the discharge circuit 250 according to the switching control signal to self-discharge one or more of the battery cells 100-1, 100-2, . . . , and 100-n of the battery 100. The discharged battery cell may be a battery cell having a voltage value greater than or equal to a reference voltage Vref.

The BMS 220 controls all components of the protection circuit 200 in the embodiment shown in FIG. 1, but the present invention is not limited thereto. For example, the battery pack 1 may further include an analog front end for measuring a voltage of the battery 100 and controlling operations of the charge control switch 231 and the discharge control switch 232, and the BMS 220 controls the analog front end.

Each of the charge control switch 231 and the discharge control switch 232 may include a field-effect transistor (FET) and a parasitic diode. In other words, the charge control switch 231 includes a first FET FET1 and a first parasitic diode D1, and the discharge control switch 232 includes a second FET FET2 and a second parasitic diode D2. A connection direction between a source and a drain of the first FET FET1 of the charge control switch 231 is opposite a connection direction between a source and a drain of the second FET FET2 of the discharge control switch 232. Here, the connection of the first FET FET1 of the charge control switch 231 is configured to limit a current flow from the positive terminal 211 to the battery 100 or a current flow from the battery 100 to the negative terminal 212. The connection of the second FET FET2 of the discharge control switch 232 is configured to limit a current flow from the battery 100 to the positive terminal 211 or a current flow from the negative terminal 212 to the battery 100. The first FET FET1 of the charge control switch 231 and the second FET FET 2 of the discharge control switch 232 may be switching devices but are not limited thereto. That is, the first and second FETs FET1 and FET2 may be other suitable electric devices for performing switching functions. The first and second parasitic diodes D1 and D2 are configured so that they limit current flows in both directions.

If the battery pack 1 is abnormal, the protection device 240 permanently cuts off charging and discharging of the battery 100. To this end, the protection device 240 may include a fuse 241. After the protection device 240 operates, the battery pack 1 may not be used any more. Therefore, before the protection device 240 operates, the BMS 220 controls the charge control switch 231 and the discharge control switch 232 to control charging and discharging of the battery 100. If the battery pack 1 remains in an unstable state, e.g., the voltage of the battery 100 is greater than or equal to a reference voltage or temperature, in spite of the control of the BMS 220, the BMS 220 operates the protection device 240 to completely cut off a high current path to permanently cut off charging and discharging of the battery 100.

The protection device control switch 242 performs on and off operations according to the control signal output from the protection device control terminal FC. In the embodiment shown in FIG. 1, the protection device control switch 242 includes a third FET FET3 as an N-channel transistor and a third parasitic diode D3. When the protection device control terminal FC applies a high level signal as a control signal to the protection device control switch 242, the protection device control switch 242 is switched on so that a current flows in a resistor Rf and the protection device 240. For example, when the fuse 241 is used as the protection device 240, the fuse 241 is cut or blown by the current.

The discharge circuit 250 discharges (e.g., compulsorily discharges) the battery cells 100-1, 100-2, ..., and 100-n. The discharge circuit 250 includes the switches SW1-1, SW1-2, SW1-3, ..., and SW1-n, a plurality of resistors R1-1, R1-2, R1-3, ..., and R1-n, a plurality of diodes ZD1-1, ZD1-2, ..., and ZD1-n, and a plurality of capacitors C1-1, C1-2, ..., and C1-n. The diodes ZD1-1, ZD1-2, ..., and ZD1-n may be Zener diodes. The discharge circuit 250 switches on or off the switches SW1-1, SW1-2, SW1-3, ..., and SW1-n according to the switching control signal output from the BMS 220 to form a loop of one or more of the battery cells 100-1, 100-2, ..., and 100-n so that the battery discharges itself. For example, if the battery cell 100-1 has a voltage greater than or equal to the reference voltage Vref, the BMS 220 switches on the first and second switches SW1-1 and SW1-2, and a current flows through a path including the first resistor R1-1, the diode ZD1-1, and the resistor R1-2 to discharge power from the battery cell 100-1.

A method of controlling the battery pack 1 will now be described in more detail.

Figure 2:
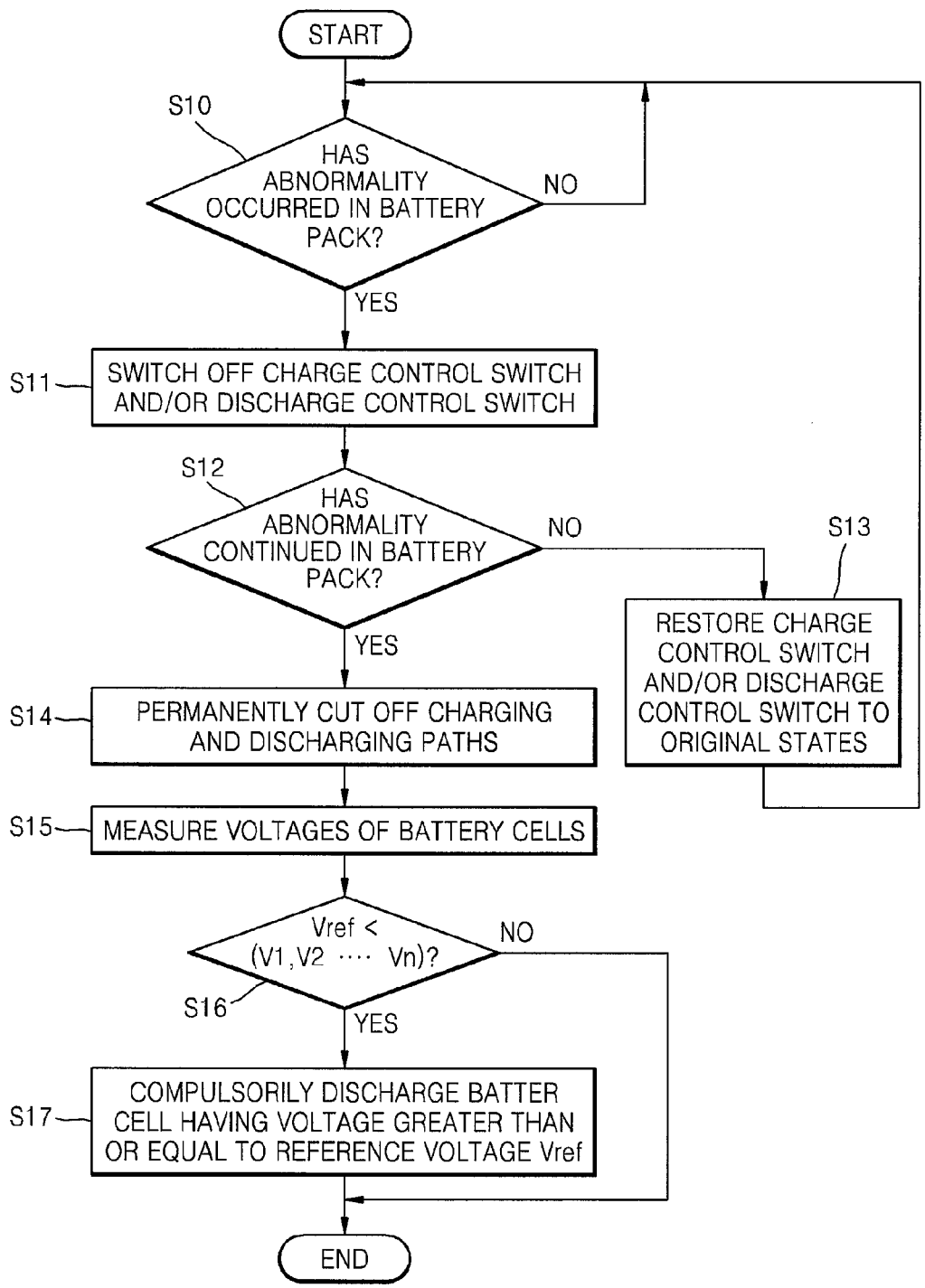
FIG. 2 is a flowchart illustrating a method of controlling the battery pack of FIG. 1, according to an embodiment of the present invention.

FIG. 2 is a flowchart illustrating a method of controlling the battery pack 1 of FIG. 1, according to an embodiment of the present invention.

Referring to FIG. 2, in operation S10, the BMS 220 monitors the components of the battery pack 1 to determine whether an abnormality has occurred in the battery pack 1. The abnormality indicates, for example, an over-discharge, an over-charge, an over-current, or the like. When it is determined in operation S10 that the abnormality has not occurred in the battery pack 1, the BMS 220 continues to monitor the components of the battery pack 1. Otherwise, when it is determined in operation S10 that the abnormality has occurred in the battery pack 1, the BMS 220 switches off the charge control switch 231 and/or the discharge control switch 232 in operation S11.

In operation S12, the BMS 220 determines whether or not the abnormality has continued in the battery pack 1. When the BMS 220 determines in operation S12 that the abnormality has ended, the BMS 220 restores the charge control switch 231 and/or the discharge control switch 232 to their original states in operation S13 and the method returns to operation S10 to monitor the battery pack 1.

Otherwise, when the BMS 220 determines in operation S12 that the abnormality has continued in the battery pack 1, e.g., the voltage of the battery 100 is greater than or equal to a reference voltage (e.g., a preset voltage) or temperature remains greater than or equal to a reference temperature (e.g., a preset temperature) for a set period of time, the BMS 220 operates the protection device 240 to permanently cut off charging and discharging paths in operation S14.

In operation S15, the BMS 220 measures voltages of the battery cells 100-1, 100-2, ..., and 100n. In operation S16, the BMS 220 compares the measured voltages of the battery cells 100-1, 100-2, ..., and 100n with the reference voltage Vref.

When the BMS 220 determines in operation S16 that one of the battery cells 100-1, 100-2, ..., and 100-n has a measured voltage greater than the reference voltage Vref, the BMS 220 discharges (e.g., compulsorily discharges) the battery cell having the voltage greater than the reference voltage Vref in operation S17. When the discharged battery cell satisfies a reference voltage Vref (e.g., a preset reference voltage), the BMS 220 ends discharging of the battery cell and then an operation of the battery pack 1. Here, the reference voltage Vref may indicate that the voltage of the discharged battery cell becomes less than or equal to a set voltage, that the battery cell has been completely discharged, or the like. Otherwise when the BMS 220 determines in operation S16 that none of the battery cells 100-1, 100-2, ..., and 100-n have a voltage greater than the reference voltage Vref, the BMS 220 ends the operation of the battery pack 1.

As described above, the battery pack 1 according to the present embodiment permanently cuts off charging and discharging thereof and then discharges (e.g., compulsorily discharges) a battery cell that is in an unstable state. Therefore, the battery pack 1 changes from its failed state to a stable state.

Figure 3:
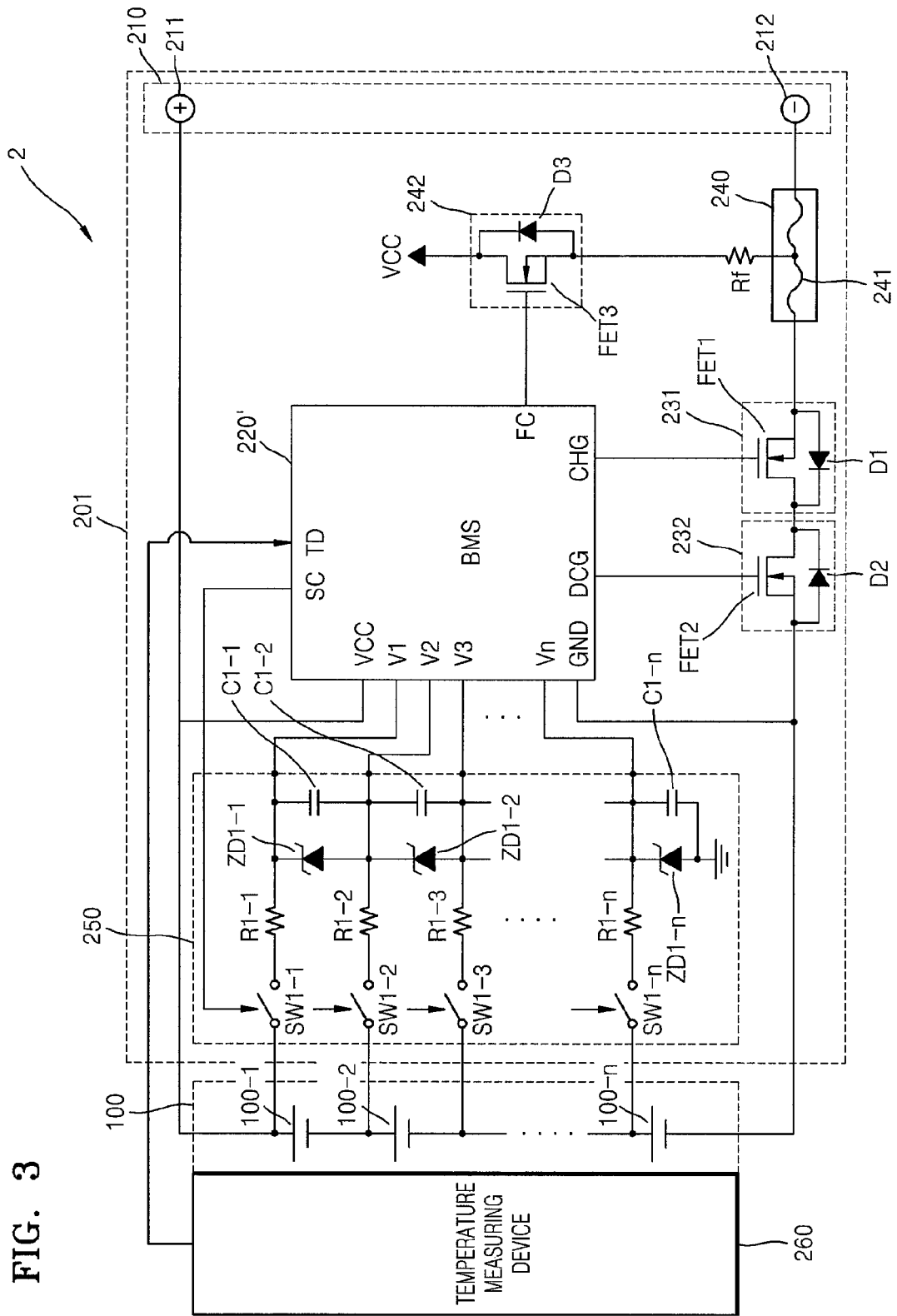
FIG. 3 is a circuit diagram illustrating a battery pack according to another embodiment of the present invention.

FIG. 3 is a circuit diagram illustrating a battery pack 2 according to another embodiment of the present invention.

Referring to FIG. 3, the battery pack 2 includes a battery 100 and a protection circuit 201. The battery pack 2 has substantially the same structure as the battery pack 1 of FIG. 1, and thus only components of the battery pack 2 that are different from those of the battery pack 1 will be described herein.

The protection circuit 201 includes a terminal part 210, a BMS 220', a charge control switch 231, a discharge control switch 232, a protection device 240, a protection device control switch 242, and a discharge circuit 250. The protection circuit 201 further includes a temperature measuring device 260.

The BMS 220' controls cell balancing, charging, and discharging of the battery 100. In comparison with the BMS 220 of the battery pack 1 of FIG. 1, the BMS 220' further includes a temperature sensing terminal TD for sensing temperatures.

The temperature sensing terminal TD receives temperature data "d" of battery cells 100-1, 100-2, ..., and 100-n measured by the temperature measuring device 260. One terminal and one signal line are shown in FIG. 3 for convenience. However, a plurality of signal lines and a plurality of terminals as the temperature sensing terminal TD may be installed to receive the temperature data "d" of the battery cells 100-1, 100-2, ..., and 100-n.

The BMS 220' controls switches SW1-1, SW1-2, SW1-3, ..., and SW1-n of the discharge circuit 250 according to a switching control signal so as to force one or more of the battery cells 100-1, 100-2, ..., and 100-n of the battery 100 to discharge itself. Here, the discharged battery cell may be a battery cell having a temperature greater than or equal to a reference temperature Tref.

A method of controlling the battery pack 2 of FIG. 3 will now be described in more detail.

Figure 4:
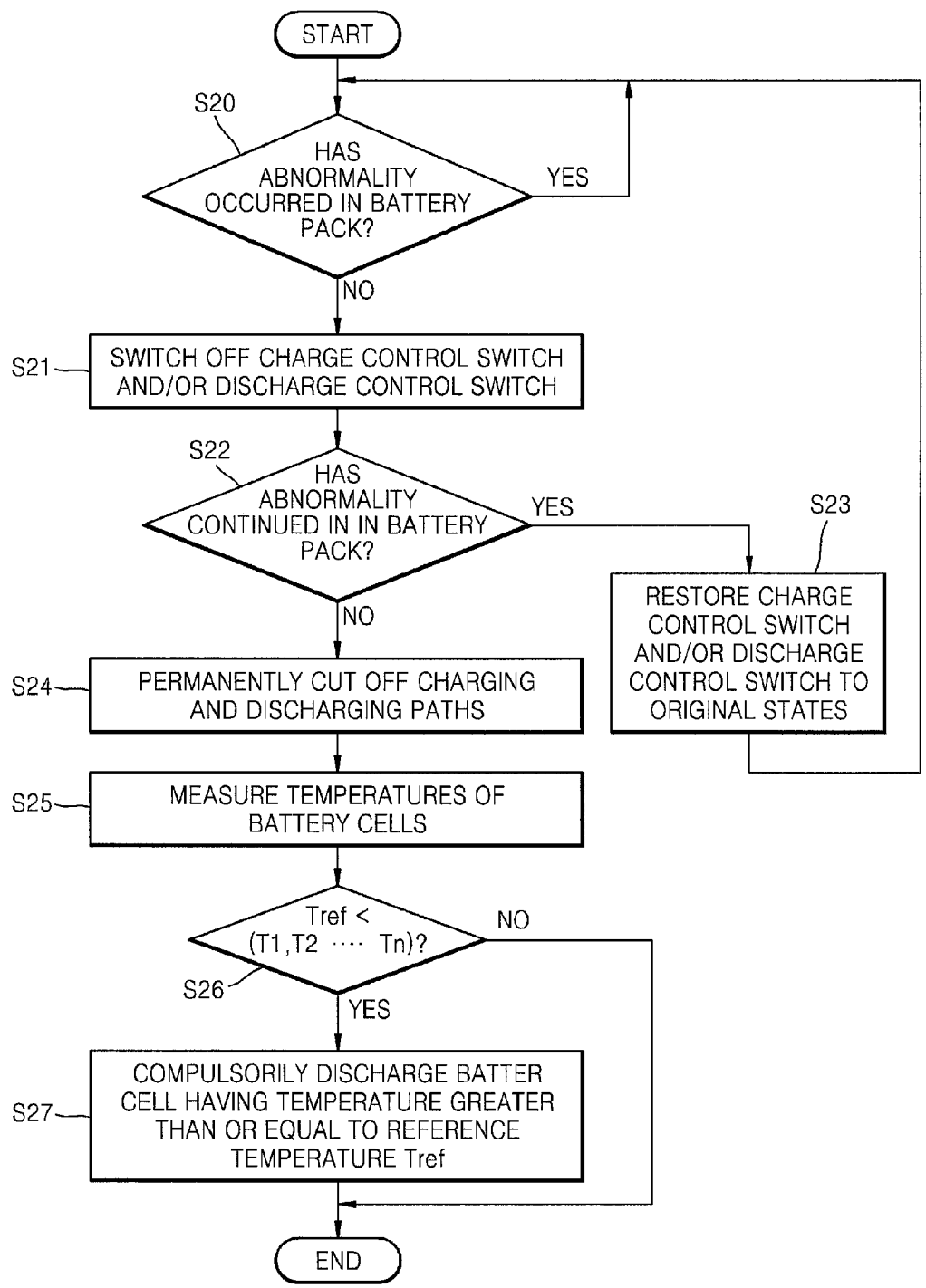
FIG. 4 is a flowchart illustrating a method of controlling the battery pack of FIG. 3, according to another embodiment of the present invention.

FIG. 4 is a flowchart illustrating a method of controlling the battery pack 2 of FIG. 3, according to another embodiment of the present invention.

Referring to FIG. 4, in operation S20, the BMS 220' monitors components of the battery pack 2 to determine whether an abnormality has occurred in the battery pack 2. The abnormality indicates, for example, an over-discharge, an over-charge, an over-current, or the like. When the BMS 220' determines in operation S20 that the abnormality has not occurred in the battery pack 2, the BMS 220' continues to monitor the components of the battery pack 2. When the BMS 220 determines in operation S20 that the abnormality has occurred in the battery pack 2, the BMS 220 switches off the charge control switch 231 and/or the discharge control switch 232 in operation S21.

In operation S22, the BMS 220' determines whether or not the abnormality has continued in the battery pack 2. When the BMS' 220 determines in operation S22 that the abnormality has ended, the BMS 220 restores the charge control switch 231 and/or the discharge control switch 232 to their original states in operation S23 and then returns to operation S20 to monitor the battery pack 2.

When the BMS 220 determines in operation S22 that the abnormality has continued in the battery pack 2, e.g., a voltage of the battery 100 is greater than or equal to a reference voltage or temperature or remains greater than or equal to the reference voltage or temperature for a set period of time, the BMS 220' operates the protection device 240 to permanently cut off charge and discharge paths in operation S24.

In operation S25, the BMS 220' measures temperatures of the battery cells 100-1, 100-2, ..., and 100-n. In operation S26, the BMS 220' compares the measured temperatures with a reference temperature Tref.

When the BMS 220 determines in operation S26 that one or more of the battery cells 100-1, 100-2, ..., and 100-n have the measure temperature greater than the reference temperature Tref, the BMS 220' discharges (e.g., compulsorily discharges) the battery cell having the temperature greater than the reference temperature Tref in operation S27. When the discharged battery cell satisfies a reference condition, the BMS 220' ends discharging of the battery cell and then an operation of the battery pack 2. Here, the reference condition may indicate that a voltage of the discharged battery cell becomes less than or equal to a reference voltage, that the temperature of the discharged battery cell becomes less than or equal to a reference temperature, that the discharged battery cell has been completely discharged, or the like. When the BMS 220' determines in operation S26 that none of the battery cells 100-1, 100-2, ..., and 100-n have the temperature greater than or equal to the reference temperature Tref, the BMS 220 immediately ends the operation of the battery pack 2.

As described above, the battery pack 2 according to the present embodiment permanently cuts off charging and discharging thereof and then discharges (e.g., compulsorily discharges) a battery cell that is in an unstable state. Therefore, the battery pack 2 changes from its failed state to a stable state. In other words, the stable state is restored.

As described above, according to the one or more of the above embodiments of the present invention, controlling methods according to the embodiments may be stored as power storage system executable programs on a recording medium. The recording medium may be a processor-readable medium, e.g., a semiconductor recording medium (e.g., a flash memory, a static random access memory (SRAM), etc.), or the like. The recording medium may be embedded in the BMS 220 or the BMS 220' and may be executed in a processor of the BMS 220 or the BMS 220'.

While the present invention has been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. A method of controlling a battery pack comprising a plurality of battery cells, the method comprising:
    switching off at least one of a charge control switch and a discharge control switch in a first charging and discharging path after determining an abnormality has occurred in the battery pack;
    permanently cutting off the first charging and discharging path of the battery pack, when the abnormality has continued in the battery pack;
    measuring voltages or temperatures of the plurality of battery cells, after permanently cutting off the first charging and discharging path of the battery pack; and
    discharging one or more of the battery cells when a voltage or temperature of the one or more of the battery cells satisfy a reference condition by forming a second discharging path different from the first charging and discharging path for the one or more of the battery cells that satisfy the reference condition, after permanently cutting off the first charging and discharging path of the battery pack.

2. The method of claim 1, wherein a battery cell having the measured voltage greater than or equal to a reference voltage from among the plurality of battery cells is discharged.

3. The method of claim 1, wherein a battery cell having the measured temperature greater than or equal to a reference temperature from among the plurality of battery cells is discharged.

4. A battery pack comprising:
    a plurality of battery cells;
    charge and discharge control switches in a first charging and discharging path for limiting a current flow from a positive terminal of the battery pack to the battery cells or a current flow from the battery cells to a negative terminal of the battery pack;
    a protection device for permanently cutting off the first charging and discharging path of the battery pack, the protection device being coupled between the charge and discharge control switches and the negative terminal;
    a discharge circuit for discharging one or more of the plurality of battery cells by forming a loop around one or more of the battery cells using switches; and
    a battery management system (BMS) for switching off the charge and discharge control switches after determining an abnormality has occurred in the battery pack, permanently cutting off the first charging and discharging path of the battery pack when the abnormality has continued in the battery pack, measuring voltages or temperatures of the plurality of battery cells after permanently cutting off the first charging and discharging path of the battery pack, and operating the discharge circuit to discharge the one or more of the plurality of battery cells, when the voltage or temperature of the one or more of the plurality of battery cells satisfy a reference condition by forming a second discharging path different from the first charging and discharging path for the one or more of the plurality of battery cells that satisfy the reference condition, after the protection device permanently cuts off the first charging and discharging path of the battery pack.

5. The battery pack of claim 4, further comprising a voltage measuring device for measuring voltages of the plurality of battery cells.

6. The battery pack of claim 5, wherein the BMS is configured to discharge a battery cell having the measured voltage greater than or equal to a reference voltage from among the plurality of battery cells.

7. The battery pack of claim 4, further comprising a temperature measuring device for measuring temperatures of the plurality of battery cells.

8. The battery pack of claim 7, wherein the BMS is configured to discharge a battery cell having the measured temperature greater than or equal to a reference temperature from among the plurality of battery cells.

9. A battery pack comprising:
a plurality of battery cells;
a sensing device for sensing conditions of the plurality of battery cells;
charge and discharge control switches in a first charging and discharging path for limiting a current flow from a positive terminal of the battery pack to the battery cells or a current flow from the battery cells to a negative terminal of the battery pack in response to sensing an abnormal condition by the sensing device;
a protection device for permanently disabling charging and discharging of the battery pack through the first charging and discharging path when the abnormal condition has continued in the battery pack; and
a discharge circuit for discharging one or more of the plurality of battery cells by forming a second discharge path different from the first charging and discharging path, after permanently disabling the charging and discharging of the battery pack.

10. The battery pack of claim 9, wherein the sensing device comprises sensors for sensing voltages of the plurality of battery cells.

11. The battery pack of claim 9, wherein the sensing device comprises sensors for sensing temperatures of the plurality of battery cells.

12. The battery pack of claim 9, wherein, in the abnormal condition, at least one of the plurality of battery cells has a voltage greater than or equal to a reference voltage.

13. The battery pack of claim 9, wherein, in the abnormal condition, at least one of the plurality of battery cells has a temperature greater than or equal to a reference temperature.

* * * * *